July 28, 1953     W. H. VINTON ET AL     2,647,054

PHOTOGRAPHIC EMULSIONS CONTAINING SENSITIZING DYES

Filed Feb. 21, 1951

FIG. 1
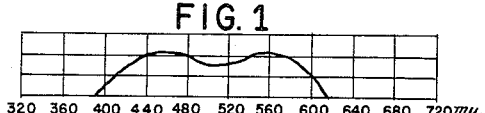
Gelatin Silver Iodobromide Emulsion Containing Dye Of Example 1
(3:3'-diethyl-5-carbomethoxy-5'-methyloxathiacarbocyanine iodide)

FIG. 1A
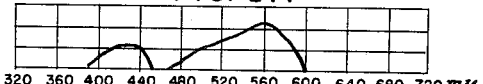
Gelatin Silver Bromochloride Emulsion* Containing Dye Of Example 1A.
(3:3'-diethyl-5-carbomethoxy-5'-methyloxathiacarbocyanine iodide)

FIG. 2
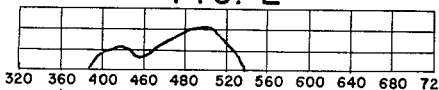
3:3'-diethyl-5-carbomethoxy oxathiazolinocarbocyanine iodide (II)

FIG. 3
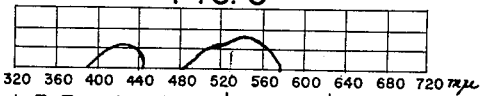
1:3:3-trimethyl-2'-ethyl-5'-carbomethoxy indolenoxacarbocyanine iodide (III)

FIG. 4
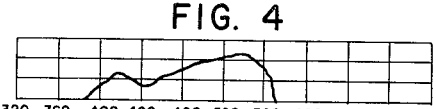
3:3'-diethyl-5-carbomethoxy-4':5'-benzoxacarbocyanine iodide (IV)

FIG. 5
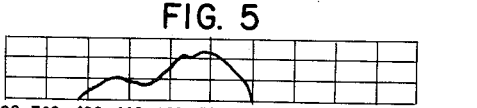
3:3'-diethyl-5-carbomethoxy-5'-6'-dimethyl oxacarbocyanine iodide (V)

FIG. 6
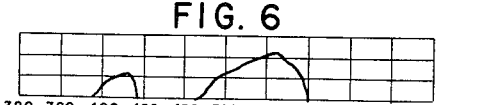
3:3'-diethyl-5-carbomethoxy-oxaselenacarbocyanine iodide (VI)

FIG. 7
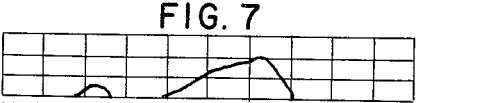
3:3'-diethyl-5-carbomethoxy-5'-methyl oxaselenacarbocyanine iodide (VII)

FIG. 8
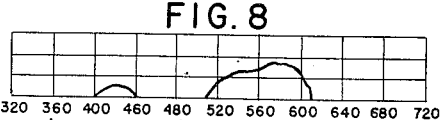
3:3'-diethyl-5'-carbomethoxy oxa-α-naphthselenacarbocyanine iodide (VIII)

FIG. 9
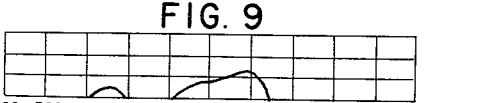
1:3:3-trimethyl-2'-ethyl-5'-carbethoxy indolenoxacarbocyanine iodide (IX)

FIG. 10
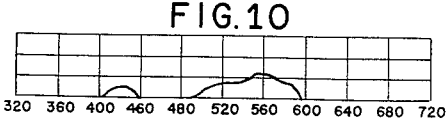
3:3'-diethyl-5-carbethoxy-oxathiacarbocyanine iodide (X)

FIG. 11
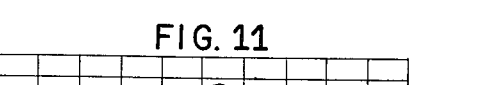
3:3'-diethyl-5-carbethoxy-4':5'-benzoxacarbocyanine iodide (XI)

\* This emulsion is used in all FIGS. except FIG.1., and each dye is identified with the example number

INVENTORS
WILLIAM HOWELLS VINTON
JOHN CHARLES FIRESTINE

BY *Lynn Barrett Morris*

ATTORNEY

Patented July 28, 1953

2,647,054

UNITED STATES PATENT OFFICE 2,647,054

PHOTOGRAPHIC EMULSIONS CONTAINING SENSITIZING DYES

William Howells Vinton, Parlin, and John Charles Firestine, South River, N. J., assignors to E. I. du Pont de Nemours & Company, Wilmington, Del., a corporation of Delaware Application February 21, 1951, Serial No. 212,210

5 Claims. (Cl. 95—7)

This invention relates to new unsymmetrical carbocyanine dyes. More particularly, it relates to unsymmetrical carbocyanine dyes which contain a 5-carbalkoxybenzoxazole radical linked to a different heterocyclic nitrogen radical through an unsubstituted trimethine chain. The invention also relates to photographic silver halide emulsions containing such dyes.

An object of this invention is to provide a new group of carbocyanine dyes. A further object is to provide such a group of dyes which will confer an extra range of sensitivity to silver halide emulsions. A still further object is to provide such dyes which yield developed silver halide images which are free from residual stain. Still other objects will be apparent from the following description of the invention.

The unsymmetrical carbocyanine dyes of this invention may be represented by the following general formula:

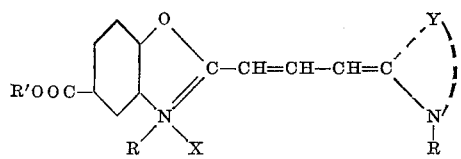

where R is an alkyl radical, R' is an alkyl radical of 1 to 4 carbon atoms, X is the negative radical of an acid and Y constitutes the atoms necessary to complete a thiazoline, benzothiazole, naphthoxazole, or substituted benzoxazole free from an ester substituent, benzoselenazole, naphthothiazole, naphthoselenazole, and dimethylindolenine radical. The benzene rings of such radicals may be further substituted by one or more alkyl groups of 1 to 3 carbon atoms.

Suitable specific radicals for R in the above formula include methyl, ethyl, n-propyl, isopropyl, and benzyl. Suitable specific radicals for R' include methyl, ethyl, n-propyl, isopropyl, n-butyl and tertiary-butyl. Among the useful acid radicals represented by X are Cl, Br and I; perchlorate, —SCN, p-toluenesulfonate, methosulfate and ethosulfate.

The dyes of the above general formula can be made by condensing a 2-(β-anilino) (or β-acetanilino) vinyl-5-carbalkoxybenzoxazole quaternary salt with a quaternary salt of a thiazoline, benzoxazole, benzothiazole, benzoselenazole, naphthothiazole, naphthoxazole, or naphthoselenazole which contain a reactive methyl group in the alpha position to the heterocyclic nitrogen atom. This condensation reaction is preferably carried out in the presence of an acid binding agent or solvent, e. g., pyridine, piperidine, fused sodium acetate, tri-n-propylamine, tri-ethanolamine, cyclohexylamine, sodium ethylate, caustic soda, etc. However, additional solvents may be used during the condensation reaction, e. g., acetic anhydride with sodium acetate, ethyl alcohol with alkali metal bases, etc. The two heterocyclic reactants are preferably used in substantially equimolecular proportions. However, an excess of one of such reactants may be used if desired. The reaction, in general, is carried out at temperatures below 200° C. at atmospheric pressure. In general, the reaction is conducted under conditions of reflux.

The 2-(β-anilino) (or β-acetanilino) vinyl-5-carbalkoxybenzoxazole quaternary salts can be made from 2-methyl-5-carbalkoxybenzoxazoles by reacting the latter with an alkyl halide or ester and then reacting the resulting quaternary salt with diphenylformamidine. The preparation of representative intermediates is described in the following procedures:

PREPARATION A 2-methyl-5-carbomethoxybenzoxazole

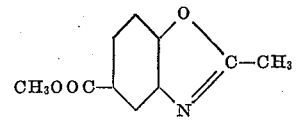

To a mixture of 300 ml. of fuming nitric acid (sp. g. 1.5) and 1500 ml. of glacial acetic acid, there was added gradually 75 g. (0.50 mol) of methyl p-hydroxybenzoate. The temperature was maintained at about 45° C. during the addition, and then the mixture was allowed to stand until the temperature dropped to 40° C. It was then poured onto cracked ice (about 3 kg.), and the yellow solid which separated was filtered off, washed well with water, taken up in ether, and dried with calcium chloride. The ether solution was filtered and the ether was evaporated. There was thus obtained 66 g. (68% of theory) of pale yellow crystals, melting at 75°–76° C. of methyl 3-nitro-4-hydroxybenzoate.

In a suitable three-neck flask fitted with a reflux condenser there was placed 120 g. of the above methyl 3-nitro-4-hydroxybenzoate and 3000 ml. of acetic anhydride. The mixture was heated to reflux, and zinc dust was added until the mixture became colorless. The mixture then boiled for a short time and a little excess zinc added. The solution was then cooled, the zinc and zinc acetate filtered off and washed well with acetic anhydride. The filtrate and washings were distilled at atmospheric pressure to remove acetic acid and acetic anhydride. The residue was heated at atmospheric pressure until ring closure was evident (visible splitting out of acetic acid). The oily residue was then distilled in vacuo, and the distillate was refractionated, collecting material boiling at 160°–165° C. at 14 mm. A yield of 138 g. was obtained (59.4% of theory). Recrystallization from alcohol gave crystals of 2-methyl-5-carbomethoxybenzoxazole melting at 69° C.

Analysis based on C₁₀H₉NO₃:

|  | Calculated, Percent | Found, Percent | |
|---|---|---|---|
| Carbon | 62.8 | 63.44 | 63.23. |
| Hydrogen | 4.71 | 4.88 | 5.24. |
| Nitrogen | 7.33 | 7.47 | 7.32 (Dumas). |

PREPARATION B

2 - (β - acetanilido)vinyl - 5 - carbomethoxybenzoxazole ethiodide

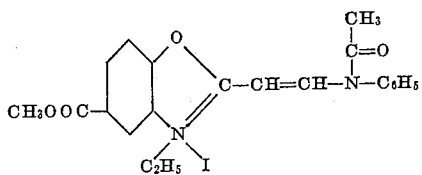

To 19.1 g. of 2-methyl-5-carbomethoxybenzoxazole there was added 15.4 g. of diethyl sulfate. The mixture was heated in an oil bath at 120°–130° C. for three hours. Then there was added 200 ml. of acetic anhydride and 19.6 g. of N,N-diphenylformamidine. The mixture was refluxed for 20 minutes, cooled and diluted with ether. The desired intermediate separated as an oil, from which the ether was decanted and the oil was washed with fresh ether. The ether was again decanted and excess potassium iodide solution added. The intermediate crystallized at this point (as the iodide), was filtered and washed with water. The solid which separated out was filtered, washed with clean acetone, and recrystallized from alcohol. There was thus obtained 9.0 g. of yellow sparkling crystals melting at 210°–212° C. This was 18% of the theoretical yield.

The preparation of representative unsymmetrical carbocyanine dyes of the invention is set forth in the following examples.

Graphs of the spectrograms of the dyes of such examples are shown in the accompanying drawing wherein Fig. 1 is a graph of the spectrogram of a gelatin silver iodide bromide emulsion containing the dye of Example I, Fig. 1A is a graph of the spectrogram of a gelatin bromochloride emulsion containing the dye of Example I, Fig. 2 is a graph of the spectrogram of a gelatin bromochloride emulsion containing the dye of Example II, Fig. 3 is a graph of the spectrogram of a gelatin bromochloride emulsion containing the dye of Example III, Fig. 4 is a graph of the spectrogram of a gelatin bromochloride emulsion containing the dye of Example IV, Fig. 5 is a graph of the spectrogram of a gelatin bromochloride emulsion containing the dye of Example V, Fig. 6 is a graph of the spectrogram of a gelatin bromochloride emulsion containing the dye of Example VI, Fig. 7 is a graph of the spectrogram of a gelatin bromochloride emulsion containing the dye of Example VII, Fig. 8 is a graph of the spectrogram of a gelatin bromochloride emulsion containing the dye of Example VIII, Fig. 9 is a graph of the spectrogram of a gelatin bromochloride emulsion containing the dye of Example IX, Fig. 10 is a graph of the spectrogram of a gelatin bromochloride emulsion containing the dye of Example X, Fig. 11 is a graph of the spectrogram of a gelatin bromochloride emulsion containing the dye of Example XI.

EXAMPLE I

Preparation of the dye having the structure:

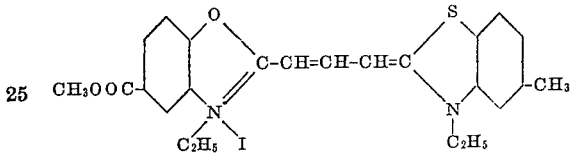

In a suitable heat-resisting glass flask there were placed 0.815 g. of 2,5-dimethylbenzothiazole and 0.77 g. of diethyl sulfate. The mixture was heated for two hours at 120°–130° C. and then 20 ml. of dry pyridine and 2 ml. of acetic anhydride were added and then 2.6 g. of 2-(β-acetanilino)vinyl-5-carbomethoxybenzoxazole ethiodide was added. The mixture was heated to reflux for 15 minutes and a magenta color formed. On cooling in a bath composed of solid carbon dioxide and acetone, the dye crystallized and was filtered off, washed with acetone and recrystallized three times from ethyl alcohol. The purple crystals of the dye of the above formula (3:3' - diethyl - 5 - carbomethoxy - 5'-methyl oxathiacarbocyanine iodide), which were obtained melted at 256° to 258° C.

An ethanol solution of the dye showed an absorption maximum at 525 millimicrons. A small amount of the dye was added to gelatino silver bromochloride emulsion and extended its sensitivity to 600 millimicrons with a peak at 560 millimicrons. When a small amount of the dye was added to a gelatino silver iodide bromide emulsion it extended its sensitivity to 620 millimicrons with a peak at 560 millimicrons.

EXAMPLE II

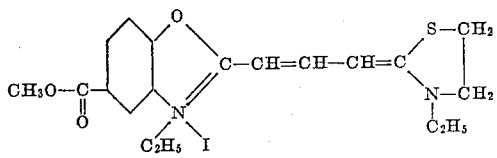

In a suitable flask there were placed 3.82 g. of 2-methyl-5-carbomethoxybenzoxazole and 3.08 g. of diethyl sulfate. The mixture was heated for three hours at 120°–130° C. and then 7.20 g. of 2 - β - anilinovinylthiazoline ethiodide together with 40 ml. of dry pyridine and 2 ml. of acetic anhydride. The mixture was heated to reflux for 15 minutes and a yellow orange color formed. The reaction mixture was cooled and diluted with ether whereupon the dye separated. The dye was filtered off and taken up in acetone. The acetone mixture was refluxed and cooled and the dye crystallized. The dye crystals were filtered off and recrystallized twice from ethyl alcohol. A yield of 0.42 g. of orange powder was obtained which melted at 233°–235° C. An ethanol solution of this dye (3:3'-diethyl-5-carbomethoxy oxathiazolinocarbocyanine iodide) which has the above formula showed an absorption maximum at 465 millimicrons. A small amount of the dye was added to a gelatino silver bromochloride emulsion and extended the range of sensitivity to 530 millimicrons with a sensitivity peak at 495 millimicrons.

EXAMPLE III

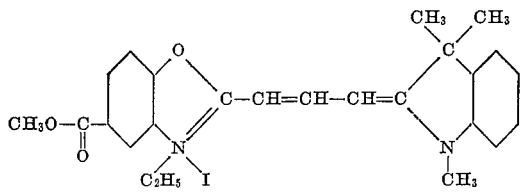

In a suitable flask there were placed 0.76 g. of 2,3,3-trimethylindolenine methiodide, 1.26 g. of 2 - (β - acetanilidovinyl) - 5 - carbomethoxybenzoxazole ethiodide, 15 ml. of dry pyridine and 1 ml. of acetic anhydride. The mixture was refluxed three minutes and a deep magenta color formed. The mixture was cooled and the dye separated as an oil. The oil was taken up in acetone where the dye was crystallized. The crystals were filtered off and recrystallized twice from ethyl alcohol. A yield of 0.31 g. of sparkling reddish-green crystals were obtained which melted at 198°–200° C. An ethanol solution of this dye (1:3:3-trimethyl-2'-ethyl-5'-carbomethoxy indolenoxacarbocyanine iodide) which had the above structural formula showed an absorption maximum at 513 millimicrons. A small amount of the dye was added to a gelatino silver bromochloride emulsion and extended its sensitivity to 570 millimicrons with a sensitivity maximum at 550 millimicrons.

EXAMPLE IV

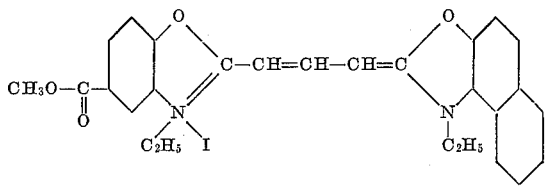

In a suitable flask there were placed 0.457 g. of 2-methyl-β-naphthoxazole and 0.4 g. of diethyl sulfate. The mixture was heated three hours at 120°–130° C. There were then added 1.26 g. 2 - (β - acetanilidovinyl) - 5 - carbomethoxybenzoxazole ethiodide, 15 ml. of dry pyridine and 2 ml. of acetic anhydride. The mixture was heated to reflux for one minute. An orange color formed and the mixture was cooled and diluted with ether. The crude dye separated as a dark solid, stirred with acetone, filtered and washed with more acetone. It was then recrystallized twice from acetone. A yield of .101 g. of red crystals was obtained which melted at 244°–245° C. An ethanol solution of this dye (3:3'-diethyl - 5 - carbomethoxy - 4':5' - benzoxacarbocyanine iodide) which has the above formula showed an absorption maximum at 500 millimicrons. A small amount of the dye was added to a gelatino silver bromochloride emulsion and extended its sensitivity to 570 millimicrons with a sensitivity maximum at 540 millimicrons.

EXAMPLE V

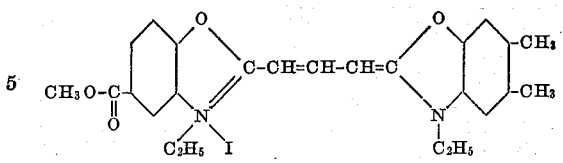

In a suitable flask there were placed 0.4 g. of 2,5,6-trimethylbenzoxazole and 0.4 g. diethyl sulfate. The mixture was heated for three hours at 120°–130° C. To this mixture there were then added 1.26 g. 2 - (β - acetanilidovinyl) - 5 - carbomethoxybenzoxazole ethiodide, 15 ml. of dry pyridine, and 5 ml. of acetic anhydride. The mixture was heated to reflux for one minute when an orange color formed. After cooling the mixture it was diluted with ether and the dye separated as a tacky solid. The dye was taken up in acetone where it crystallized. The dye was then filtered off, washed with acetone and recrystallized twice from ethyl alcohol. A yield of 0.15 g. of red crystals was obtained which melted at 247°–248° C. An ethanol solution of this dye (3:3' - diethyl - 5 - carbomethoxy - 5':6' - dimethyl oxacarbocyanine iodide) which has the above formula showed an absorption maximum at 490 millimicrons. A small amount of the dye was added to a gelatino-silver bromochloride emulsion and extended the range of sensitivity to 560 millimicrons with a sensitivity maximum at 520 millimicrons.

EXAMPLE VI

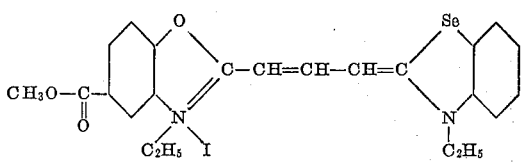

In a suitable flask there were placed 0.5 g. of 2-methylbenzoselenazole and 0.4 g. diethyl sulfate. The mixture was heated for three hours at 120°–130° C. There were then added 1.26 g. of 2 - (β - acetanilidovinyl) - 5 - carbomethoxybenzoxazole ethiodide, 15 ml. of dry pyridine and 2 ml. of acetic anhydride. The mixture was heated to reflux for three minutes and a magenta color formed. On cooling the reaction mixture, the dye crystallized out of solution. The dye crystals formed were filtered off, washed with acetone and recrystallized twice from ethyl alcohol. A yield of 0.62 g. of purple sparkling crystals were obtained which melted at 257°–258° C. An ethanol solution of the dye (3:3'-diethyl-5-carbomethoxy-oxaselenacarbocyanine iodide) which has the above formula showed an absorption maximum at 526 millimicrons. A small amount of the dye was added to a gelatino-silver bromochloride emulsion and extended the sensitivity to 600 millimicrons with a sensitivity maximum at 570 millimicrons.

EXAMPLE VII

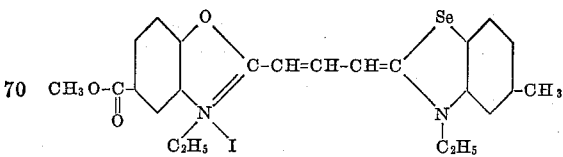

In a suitable flask there were placed 0.52 g. of 2,5-dimethylbenzoselenazole and 0.4 g. of diethyl sulfate. The mixture was heated for three hours at 120°–130° C. and there was then added 1.26 g. 2 - (β - acetanilidovinyl) - 5 - carbomethoxybenzoxazole ethiodide, 15 ml. of dry pyridine and 2 ml. of acetic anhydride. The mixture was heated to reflux for three minutes and a deep magenta color formed. The dye crystallized out of the reaction mixture on cooling. The dye crystals were filtered off, washed with acetone and recrystallized twice from ethyl alcohol. A yield of .62 g. of sparkling green crystals were obtained which melted at 255°–256° C. An ethanol solution of this dye (3:3'-diethyl-5-carbomethoxy - 5' - methyl oxaselenacarbocyanine iodide) which has the above formula showed an absorption maximum of 520 millimicrons. A small amount of the dye was added to a gelatino-silver bromochloride emulsion and extended the sensitivity to 600 millimicrons with a sensitivity maximum at 570 millimicrons.

EXAMPLE VIII

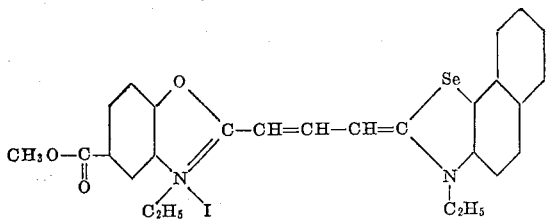

In a suitable flask there were placed 0.615 g. of 2-methyl-alpha-naphthoselenazole and 0.4 g. of diethyl sulfate. The mixture was heated together for three hours at 120°–130° C. There were then added 1.26 g. 2 - (beta - acetanilidovinyl)-5-carbomethoxybenzoxazole ethiodide, 15 ml. of dry pyridine and 2 ml. of acetic anhydride. The mixture was heated to reflux for 30 seconds during which a magenta color formed. The mixture was allowed to cool and the dye precipitated out. The dye was filtered off and recrystallized twice from alcohol. A yield of 0.63 g. of sparkling crystals were obtained which melted at 263°–264° C. An ethanol solution of the dye (3:3'-diethyl-5'-carbomethoxy oxa-α-naphthselenacarbocyanine iodide) showed an absorption maximum at 548 millimicrons. A small amount of the dye was added to a gelatino-silver bromochloride emulsion and extended the sensitivity to 610 millimicrons with a sensitivity maximum at 580 millimicrons.

EXAMPLE IX

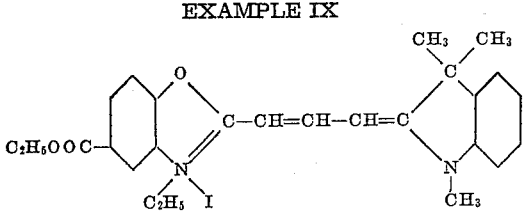

A mixture of 10 g. (0.5 mole) of ethyl 2-methyl-5-benzoxazolecarboxylate and 7.7 g. (0.5 mole) of diethyl sulfate was heated in an oil bath for three hours at 140° C. To this product was added 10 g. (0.5 mole) of diphenylformamidine and the resulting mixture fused at 180° C. for 3 min. To this hot mixture was then added 25 ml. of acetic anhydride with stirring. The desired product was precipitated from the acetic anhydride solution by the addition of ether. The yellow intermediate of the formula:

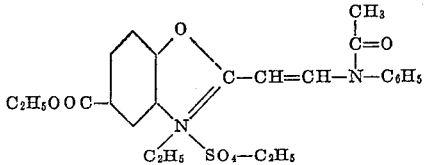

was collected by filtration and purified by extraction of the impurities with 200 ml. of boiling acetone. The yield of yellow solid, M. P. 182–183° C. was 5.6 g. (24%).

A mixture of 2.36 g. (.005 mole) of 1-ethyl-2-[2 - (N - acetylanilino) - vinyl] - 5 - carbethoxybenzoxazolium ethosulfate, 1.425 g. (.005 mole) of 2,3,3-trimethylindolenine methyl methosulfate, 20 ml. of dry pyridine, and 2 ml. of acetic anhydride was heated under reflux for four minutes with the development of a deep orange-red color. The dye (1:3:3 - trimethyl - 2' - ethyl-5' - carbethoxy indolenoxacarbocyanine iodide) of the above formula was precipitated as the iodide by the addition of an excess of aqueous potassium iodide and was collected by filtration, washed with water and recrystallized three times from acetone. The yield of purple sparkling plates, M. P. 231° C. was 1.6 g. The dye shows an absorption peak, 517 millimicrons in ethanol and confers an extra range of sensitivity to colloid silver chlorobromide emulsions extending from 485 mm. to 578 mm. with a maximum at 556 mm.

EXAMPLE X

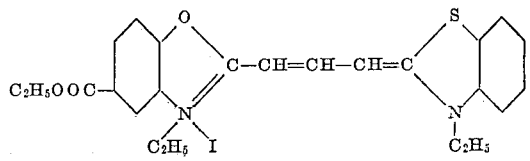

A mixture of 2.36 g. (.005 mole) of 1-ethyl-2-[2 - (N - acetylanilino) - vinyl] - 5 - carbethoxybenzoxazolium ethosulfate, 1.525 g. (.005 mole) of 2-methylbenzothiazole ethiodide and 20 ml. of dry pyridine was heated under reflux for three minutes with the development of a red-magenta color. The dye (3:3' - diethyl - 5 - carbethoxyoxathiacarbocyanine iodide) of the above formula was precipitated by the addition of 50 ml. of ether and was collected by filtration and then recrystallized three times from alcohol. The yield of purple sparkling crystals M. P. 265°–266° C., was 1.3 g. It shows an absorption peak at 523 millimicrons in ethanol and confers an extra range of sensitivity to a colloid silver chlorobromide emulsion extending from 490 mm. to 590 mm. with a maximum at 556 mm.

EXAMPLE XI

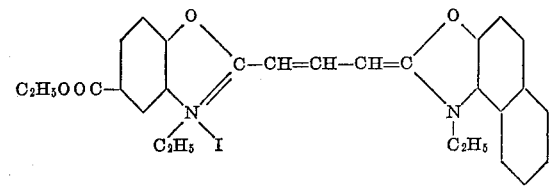

A mixture of 2.05 g. (.01 mole) of ethyl 2-methyl-5-benzoxazolecarboxylate and 1.54 g. (.01 mole) of diethyl sulfate was heated in an oil bath for three hours at 120–130° C. To this product was added 5.28 g. (.01 mole) of 1-ethyl-2 - [2 - (acetylanilino) - vinyl] - β - naphthoxazolium p-toluenesulfonate made in the same manner as the intermediate in Example IX, 40 ml. of dry pyridine and 1 ml. of acetic anhydride and the resulting mixture was heated under reflux for five minutes with the development of a deep orange color. The dye (3:3' - diethyl - 5- carbethoxy - 4':5' - benzoxacarbocyanine iodide) of the above formula was precipitated as the iodide by the addition of an excess of aqueous potassium iodide, and was collected by filtration, washed with water and recrystallized twice from alcohol. The yield of red sparkling crystals M. P. 247–248° C. was 1.3 grams. It shows an absorption peak at 502 millimicrons in ethanol and confers an extra range of sensitivity to a colloid silver chlorobromide emulsion extending from 400 mm. to 570 mm with a maximum at 540 mm.

The sensitizing dyes described in the foregoing examples are not limited in their use to any particular type of light-sensitive silver halide emulsion since they may be incorporated in water-permeable colloid silver halide emulsions of various types including those containing light-sensitive silver chloride, silver bromide, silver chlorobromide, silver iodobromide, simple and mixed emulsions. Various types of water-permeable or hydrophilic colloids can be used as binding agents for such silver halides, e. g., gelatin, albumin, agar agar; hydrophilic cellulose acetate, polyamides, hydrolyzed ethylene/vinyl acetate copolymers; polyvinyl alcohol, hydrophilic polyvinyl acetals, e. g., polyvinyl acetals of color-forming aldehydes.

What is claimed is:

1. A light-sensitive silver halide emulsion containing a compound having the general formula:

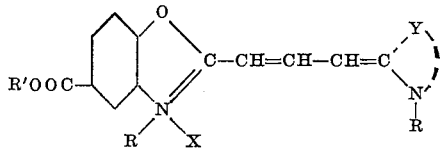

where R is an alkyl radical, R' is an alkyl radical of 1 to 4 carbon atoms, X is the negative radical of an acid and Y constitutes the atoms necessary to complete a heterocyclic nitrogen radical taken from the group consisting of thiazoline, benzoxazole, naphthoxazole, benzothiazole, naphthothiazole, benzoselenazole, naphthoselenazole and dimethylindolenine and such radicals wherein the benzene rings are substituted by at least one alkyl group of 1 to 3 carbon atoms.

2. A light-sensitive silver halide emulsion containing a compound having the general formula:

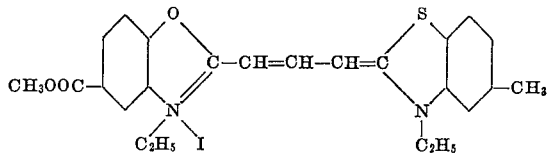

3. A light-sensitive silver halide emulsion containing a compound having the general formula:

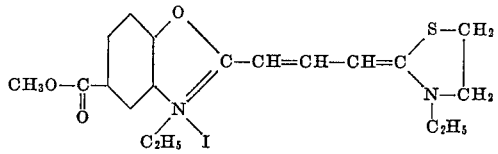

4. A light-sensitive silver halide emulsion containing a compound having the general formula:

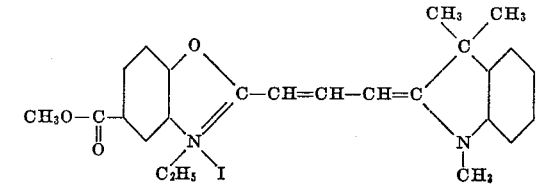

5. A light-sensitive silver halide emulsion containing a compound having the general formula:

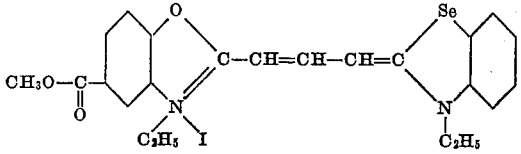

WILLIAM HOWELLS VINTON.
JOHN CHARLES FIRESTINE.

References Cited in the file of this patent
UNITED STATES PATENTS

| Number | Name | Date |
| --- | --- | --- |
| 2,166,736 | White et al. | July 18, 1939 |
| 2,263,749 | White et al. | Nov. 25, 1941 |
| 2,320,654 | Riester | June 1, 1943 |
| 2,322,015 | Hamer et al. | June 15, 1943 |
| 2,338,782 | Riester | Jan. 11, 1944 |
| 2,340,882 | Kendall | Feb. 8, 1944 |
| 2,353,164 | Kendall et al. | July 11, 1944 |